United States Patent

Schwarz et al.

[11] Patent Number: 5,823,303
[45] Date of Patent: Oct. 20, 1998

[54] BRAKE DISC

[75] Inventors: Guenther Schwarz, Tuttlingen; Ulrich Schmitt, Abtsgmuend; Armin Hipp, Kolbingen, all of Germany

[73] Assignee: Schwaebische Huettenwerke GmbH, Aalen-Wasseralfinger, Germany

[21] Appl. No.: 500,974

[22] PCT Filed: Jan. 21, 1994

[86] PCT No.: PCT/EP94/00154

§ 371 Date: Nov. 6, 1995

§ 102(e) Date: Nov. 6, 1995

[87] PCT Pub. No.: WO94/17316

PCT Pub. Date: Aug. 4, 1994

[30] Foreign Application Priority Data

Jan. 28, 1993 [DE] Germany .................. 43 02 328.2
Sep. 28, 1993 [DE] Germany .................. 43 32 951.9

[51] Int. Cl.⁶ .................................................. F16D 65/12
[52] U.S. Cl. ........................... 188/218 XL; 188/264 A
[58] Field of Search .............. 188/218 XL, 264 A, 188/264 AA, 73.1, 71.6; 192/70.12, 113.1, 113.2, 113.21, 113.23

[56] References Cited

U.S. PATENT DOCUMENTS

| | | | |
|---|---|---|---|
| 2,215,420 | 9/1940 | Eksergian | 188/264 A |
| 2,380,085 | 7/1945 | Tack et al. | 188/264 A |
| 2,769,512 | 11/1956 | Tack | 188/218 XL |
| 4,108,286 | 8/1978 | Gagarin | 188/218 XL |
| 4,792,022 | 12/1988 | Thiel | 188/264 A |
| 5,109,960 | 5/1992 | Günther | 188/218 XL |
| 5,161,652 | 11/1992 | Suzuki | 188/218 X |
| 5,429,214 | 7/1995 | Wiebelhaus et al. | 188/264 A |

FOREIGN PATENT DOCUMENTS 2221268  1/1990  United Kingdom ............ 188/218 XL Primary Examiner—Josie Ballato
Attorney, Agent, or Firm—David and Bujold

[57] ABSTRACT

A brake disc has friction ring (4) and a bearing part (1) coupled to the friction ring (4) by linking elements (3). Several linking elements designed as pins, bolts (3) or the like distributed around the circumference of the bearing part (1) and coupled to the bearing part (1) project into recesses (bores) (8) in a circumferential wall (7) of the friction ring (4). The bearing part may be a pot, the wheel hub (17) or the wheel rim.

2 Claims, 4 Drawing Sheets

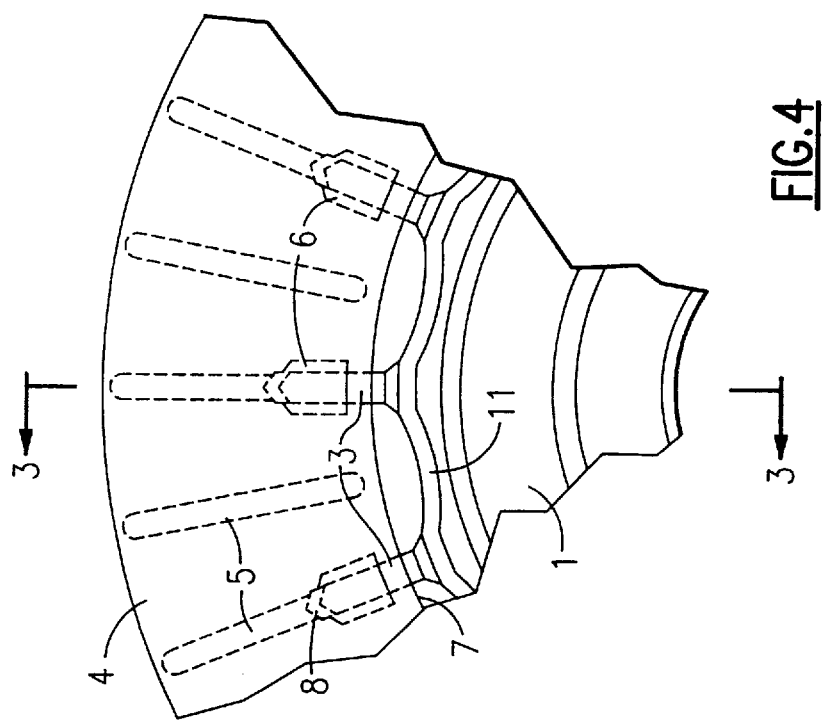
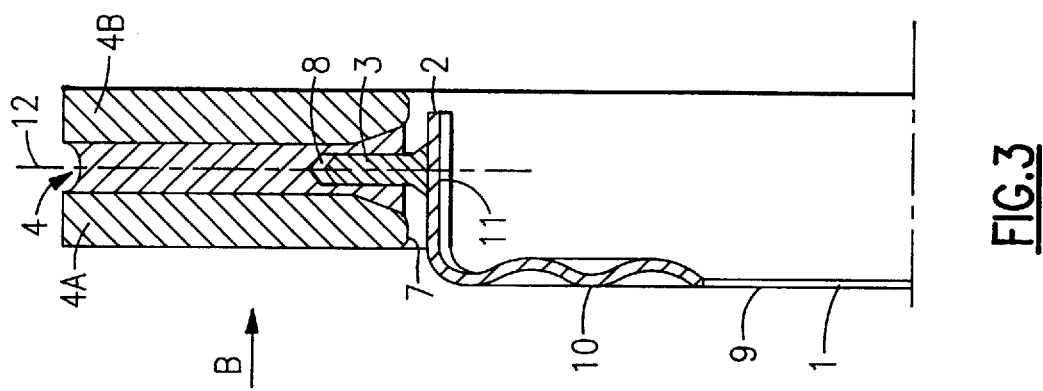

BRAKE DISC

The invention relates to a brake disc, e.g. for a disc brake of a vehicle, having a friction ring and a bearing part connected to the friction ring by connecting in the form of pins, bolts or the like.

BACKGROUND OF THE INVENTION

It is known to produce a brake disc from two parts, the friction ring generally consisting of grey cast iron and there being provided, as bearing part for the friction ring, a steel or aluminium pot. The friction ring and pot are joined together, for example, by screws, the connection being made, in the case of a ventilated brake disc, by means of a friction ring half.

A drawback with a brake disc of this type is however that corrosion problems arise between grey cast iron and steel or light metal, particularly in the case of a direct contact by means of screws and in connection with salt water, e.g. in winter.

There is also additionally the drawback that distortions and even cracks can arise due to different temperature expansions between the friction ring and the pot. As a result of the one-sided fastening between the friction ring and the pot, a so-called "dishing", i.e. a warping of the friction ring can arise. The friction ring, in fact, when operating at high temperatures, undergoes dimensional changes, which can lie within the millimeter range.

From DE 34 36 729 A1, a brake disc is already known which is in two parts, having a friction ring and a bearing part connected to the friction ring. The connection between the friction ring and the bearing part is made by means of bolts or pins which, on the one hand, are seated in bores in the circumferential wall of the friction ring and, on the other hand, project radially out of the circumferential wall of the bearing part. The thermally stressed brake ring is thereby intended to be able to expand independently from the hub and a heat transfer to the hub is largely prevented.

The object of the present invention is therefore to provide a brake disc of the type mentioned in the introduction, which avoids the drawbacks of the prior art and which, in particular, enables a better and less problematic expansion of the friction ring at high temperatures, where necessary even within the millimeter range.

According to the invention, this object is achieved by the fact that the pins are displaceable relative to the bores.

In place of a one-sided connection between the friction ring and the bearing part, e.g. a pot, a central connection in the axial plane of symmetry of the friction ring can be made by means of the pins, bolts or the like, whereby, for example, a dishing of the friction ring during running travel is prevented.

One of the essential advantages of the brake disc according to the invention lies in the fact that the friction ring, at the high temperatures which occur in running, is able to expand largely without difficulty.

As a result of the interposition of pins, which can consist, for example, of high-grade, e.g. stainless steel, corrosion problems can also be prevented.

Without any occurrence of tensions or warps, the friction ring is herein able in running to expand within the millimeter range.

To this end, a correspondingly minor play will generally be provided between the circumferential walls of the bores and the pins, at the same time the depth of the bores being able to be a few millimeters deeper than the length of the pins in the region in which they project into the bores.

The configuration of deeper bores is not however necessary in every case, since the friction ring will generally expand more strongly in the outward direction. The brake disc design according to the invention enables a weight reduction also to be obtained. This can be realized, for example, by the use of light metal or plastic on the pot as bearing part and by a corresponding material saving resulting from the nature of the connection between the pot and the friction ring, by means of the pins.

In practice, the connection or mounting of the friction ring, according to the invention, relative to the bearing part makes possible a mobility between the bearing part and friction ring relative to each other, the friction ring being "floatingly" mounted, since it is able to expand without difficulties at elevated temperatures. A centric suspension of the friction ring is nevertheless guaranteed at all times.

As a result of the connection, according to the invention, of the friction ring to the bearing part by means of the pins, indexing errors, as inevitably occur, according to the prior art, in the case of a screw connection, are also prevented. The design according to the invention enables the creation of an exact and dimensionally accurate connection. This is particularly the case where, for example, the pins are moulded into the bearing part when the bearing part is configured as a pot. This can be realized, for example, by casting-in. A possible measure to this end can consist in the pot being produced from a castable light metal, particularly from aluminium, and accordingly in the pins, during production, being jointly cast-in.

Instead of an aluminium pot design, the pot can also, where necessary, consist of steel or cast iron, e.g. grey cast iron, a weight reduction, due to a material saving, also being obtained in this case. In a steel pot design, the bolts are connected fixedly to the pot in a different manner. This can be realized, for example, by welding onto the outer circumferential ring of the pot.

However, a connection by bonding, is of course, also possible.

The pins can consist of a high-grade steel, particularly a stainless steel.

In order to produce the pot with the lowest possible weight, the pot can consist of relatively thin material, the pot, for example, for enhanced stability and strength, being able to be provided with wave-shaped beads in its radial part.

In addition, for reasons of stability and strength, the circumferential region of the pot can likewise be provided with wave-shaped beads.

In a design of the brake disc according to the invention as a ventilated brake disc, in which the two friction ring parts are joined together by webs, the bores will be introduced into the webs.

An advantageous design can herein consist in the bores being introduced into every second rib, which is correspondingly provided with a thickening.

In a design of this type, a double-sided through-flow of the friction ring and hence a better cooling effect, which is further aided by the pin fastening or pin suspension, is obtained, since a better air intake is thereby guaranteed.

BRIEF DESCRIPTION OF THE DRAWINGS

Three illustrative embodiments of the invention are represented in basic terms below with reference to the drawing, in which:

FIG. 3 shows a different design of a brake disc in the section along the line III—III of FIG. 4;

FIG. 4 shows a view from the direction B of FIG. 3;

DETAILED DESCRIPTION OF THE INVENTION

Figure 2:
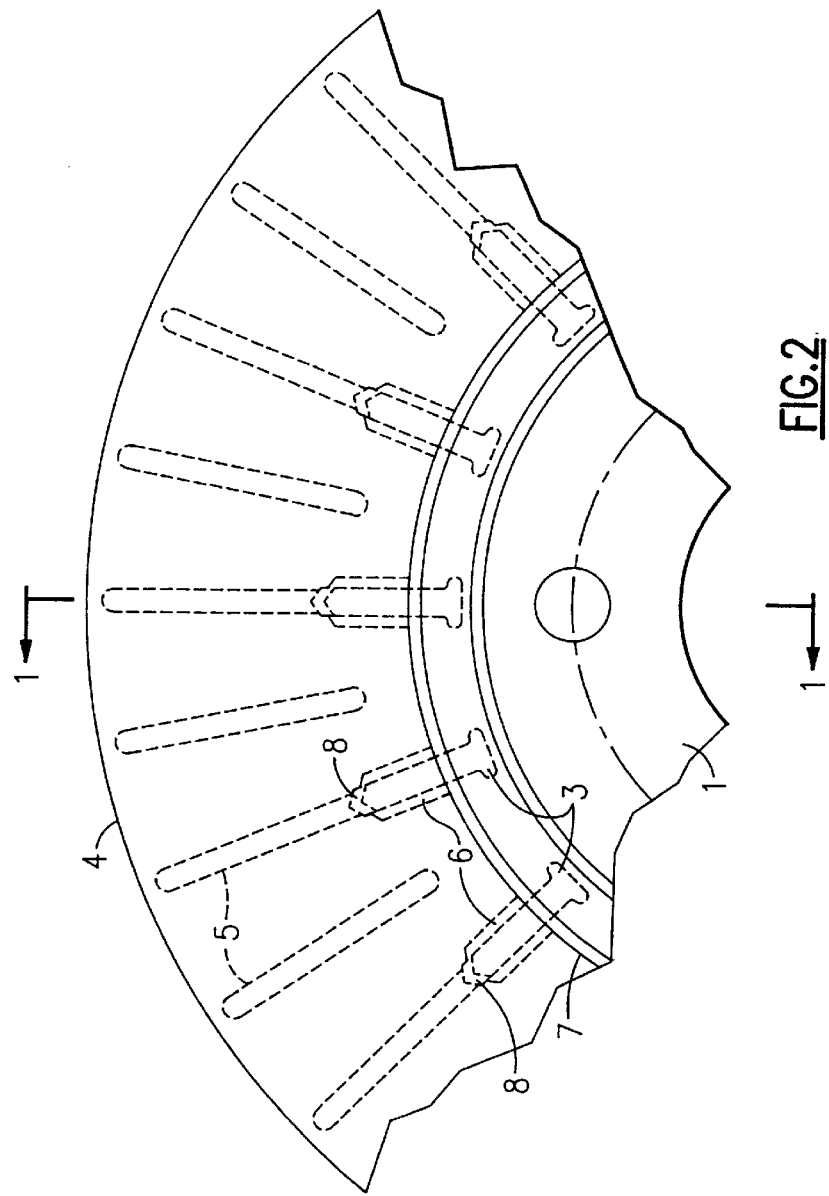
FIG. 2 shows a view of the brake disc according to FIG. 1 from the arrow direction A.
Figure 1:
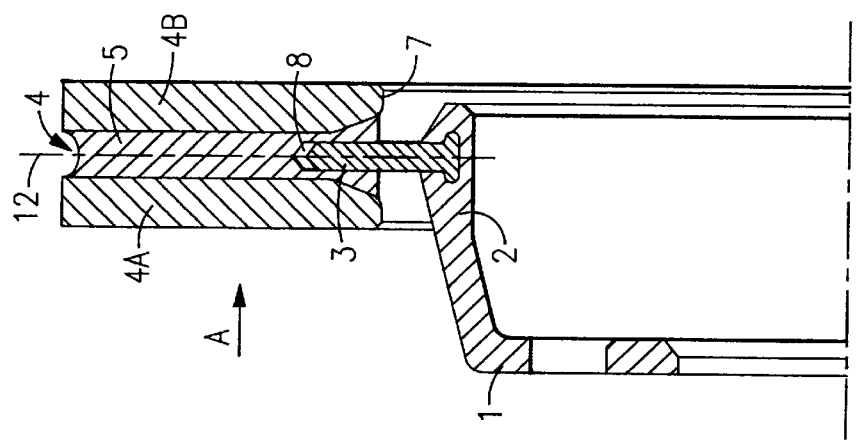
FIG. 1 shows a section along the line I—I of FIG. 2.

According to the design of a brake disc according to FIGS. 1 and 2, this has a pot 1, which is fastened in a known manner on a hub of a wheel (not represented). By means of a multiplicity of connecting elements in the form of pins 3, which connecting elements are moulded into the circumferential wall 2 of the pot, a connection is made to a friction ring 4 comprising two friction ring halves 4A and 4B, which are joined together by a multiplicity of webs 5 distributed over the circumference and running in the radial direction. In this way, a ventilated brake disc is obtained.

Every second web 5 is provided in the inner circumferential region with a thickening 6. Into the thickenings 6 there is respectively introduced, from the inner circumferential wall 7 of the friction ring 4, a bore 8. Projecting into the bores 8 located in the central longitudinal axis 12 of the friction ring 4 are the pins 3, the lengths of the pins 3 being chosen such that the depths of the bores 8 are a few millimeters, e.g. 1 to 3 mm, deeper. The diametric relationships between the bores 8 and those of the pins 3 are chosen such that the pins 3 can be displaced with minor play in the bores 8.

As can be seen, the friction ring 4 is thereby mounted "floatingly" on the pot 1 and, in the event of a corresponding temperature increase, the friction ring 4 is able to expand in the radial direction, without the risk of distortions, due to the excess length or greater depth of the bores 8. The pot 1 can consist of aluminium, the pins 3, for a positive connection between the pins 3 and the pot 1, being jointly cast, during production, into the pot 1.

In principle, the pot can be cast, forged, extruded, deep-drawn or produced in any other chosen manner.

In FIGS. 3 and 4 a design of the brake disc is represented, in which, for example, the pot 1 can be produced in very thin-walled configuration from steel. In order to achieve the necessary stability and strength, the pot 1 can herein be provided with wave-shaped beads 10 in its radial part. For enhanced stability and strength, the circumferential region 11 of the pot 1 can likewise be provided with wave-shaped beads (see FIG. 4).

As can further be seen from FIGS. 3 and 4, the pins 3 are in this case connected by welding or bonding to the circumferential region 11 of the pot 1. The other design of the brake disc corresponds to the design described in FIGS. 1 and 2.

The above-described brake disc is particularly suitable for use of a disc brake in a vehicle. In principle, it can also however be used for similar applications where there is a connection to an inner body and an annular body surrounding this, the annular body being subjected to high temperature and being intended to be able to expand accordingly.

In general, disc brakes for vehicles are configured such that the brake discs are embraced on the outer circumference by the brake shoes or brake caliper, as is represented in FIGS. 1 to 4.

Figure 5:
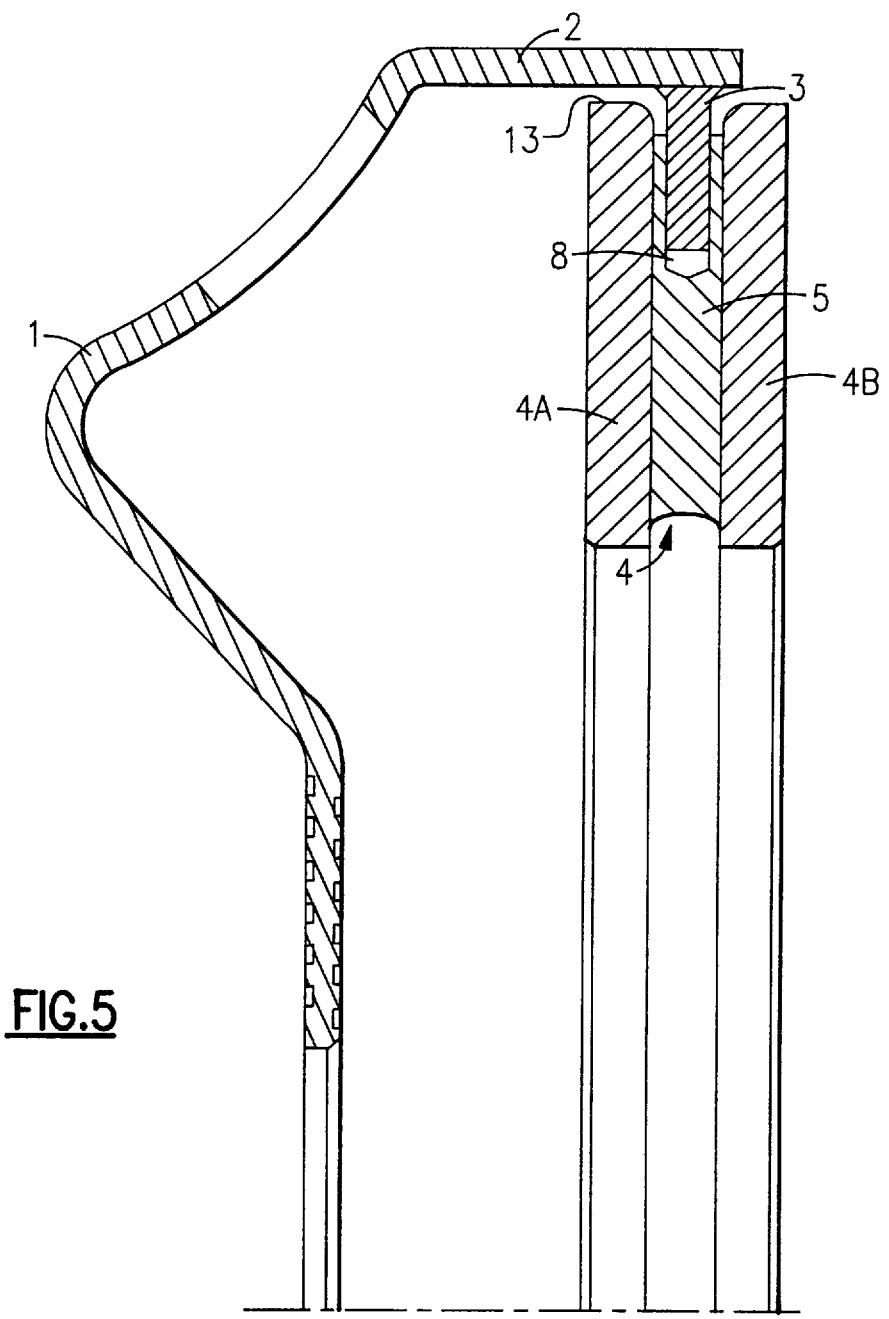
FIG. 5 shows a section similar to the sections according to FIGS. 1 and 3 for a brake disc of different design.

In the illustrative embodiment according to FIG. 5, a design of a brake disc is represented, in which the pot, in the form of a brake disc carrier, embraces the friction ring on the outside and in which brake shoes or brake caliper embrace the brake ring from the inner circumference of the latter. A brake disc device of this type is described, for example, in European Patent Specification 0 241 767. Instead of a connection of the pot or brake disc carrier to the friction ring or brake ring by means of claw-like webs, this connection being very complex and hence expensive, pins 3 are now provided to this end. In this case, the pins 3 are inserted in bores 8, which are introduced, from the outer circumferential wall 13 of the friction ring, into the webs 5. The connection to the pot 1 is herein realized, for example, likewise by welding. In this case, also, a relative motion between the pins 3 and the friction ring 4 is possible, thereby enabling the said friction ring to expand freely.

Figure 8:
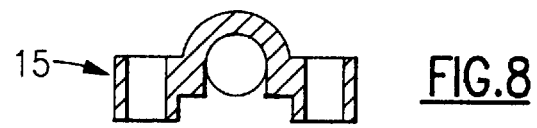
FIG. 8 shows a front view of a clamping claw.
Figure 7:
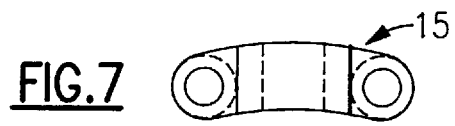
FIG. 7 shows a top view of a clamping claw.
Figure 6:
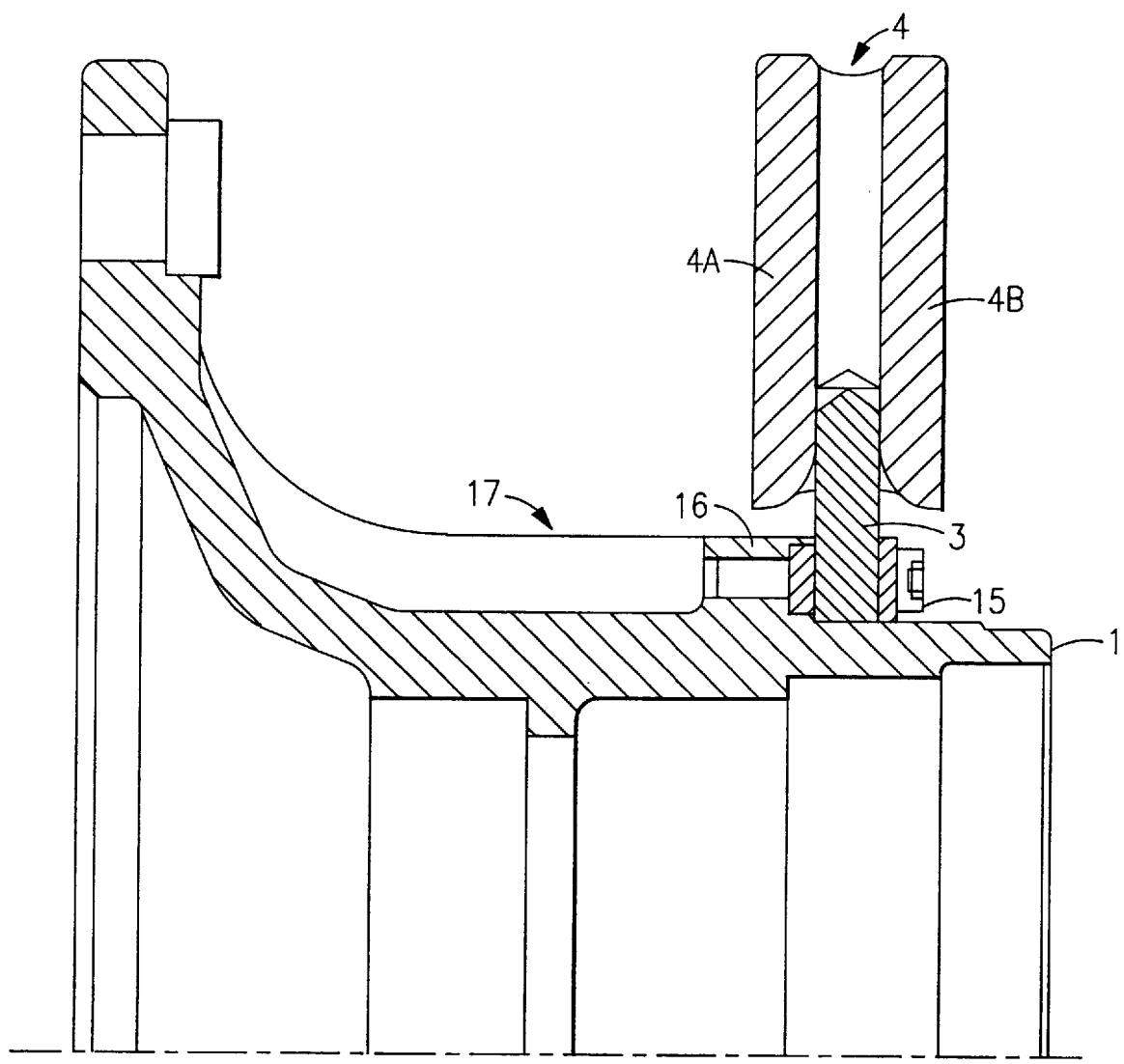
FIG. 6 shows a section through a wheel hub having a brake disc according to the invention.

In a third illustrative embodiment, a wheel hub 17 of a vehicle can also be configured as a bearing part 1 (see FIG. 6). The fastening of the pins 3 on the wheel hub 17 is herein realized by means of clamping claws 15, the precise geometry of which is represented in FIGS. 7 and 8. The clamping claws 15 are screwed to a web 16 surrounding the wheel hub 17, which web constitutes a widening of the wheel hub 17 in the radial direction, whereby the pins 3 are clamped fixedly between the web 16 and the clamping jaws 15.

An advantage with this illustrative embodiment is that the heat energy which is generated in the braking operation is not transmitted, for the large part, to the vehicle axle, but rather, because of the pin connection by which the entire heat transfer from the brake disc to the wheel hub has to be realized, only a relatively small amount of the generated heat energy is diverted to the wheel hub, whilst the greatest part remains in the brake disc and this consequently expands.

Instead of, as described, to the wheel hub, the brake disc can also be connected directly to the wheel rim. In the case of a wheel rim fastening, a connection similar to that described in FIG. 5 would be possible, i.e. the friction ring is embraced on the outside and brake shoes or brake calipers embrace, from the inner circumference of the brake ring, the brake disc carrier.

In the case of both the connection to the wheel hub and to the wheel rim, a relative motion between the pins 3 and the friction ring 4 and hence also a free expansion of the latter are possible.

We claim:

1. A brake disc having a friction ring, defining an axial plane of symmetry, and a bearing part connected to the friction ring by a plurality of pins disposed about and projecting radially outwardly from an outer circumference of the bearing part into bores extending radially outwardly from an inner circumferential opening of the friction ring located in the axial plane of symmetry, wherein the pins are displaceable relative to the bores and the bearing part is a wheel hub and the pins are connected to the wheel hub by clamping claws.

2. The brake disc according to claim 1, wherein the pins are positioned between the clamping claws and one of ribs and radial lugs.

* * * * *